United States Patent
Basavanhally et al.

(10) Patent No.: US 7,649,670 B2
(45) Date of Patent: Jan. 19, 2010

(54) METHOD AND APPARATUS FOR CONTROLLING CURVATURES OF MICROLENSES AND MICROMIRRORS

(75) Inventors: Nagesh R. Basavanhally, Skillman, NJ (US); Dan M. Marom, Howell, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 622 days.

(21) Appl. No.: 11/245,761

(22) Filed: Oct. 7, 2005

(65) Prior Publication Data

US 2007/0079922 A1    Apr. 12, 2007

(51) Int. Cl.
*G02B 26/00* (2006.01)

(52) U.S. Cl. ...................... 359/290; 359/291

(58) Field of Classification Search ............ 359/290, 359/291
See application file for complete search history.

(56) References Cited

U.S. PATENT DOCUMENTS 6,002,661 A * 12/1999 Abe et al. ............ 369/112.01
6,154,586 A * 11/2000 MacDonald et al. ......... 385/18
6,915,046 B2   7/2005 Jin et al.

* cited by examiner

*Primary Examiner*—Jordan M. Schwartz
*Assistant Examiner*—James C Jones
(74) *Attorney, Agent, or Firm*—Wall & Tong, LLP

(57) ABSTRACT

The invention includes a method and apparatus for controlling curvatures of light directing devices. The apparatus includes a first substrate portion having formed therein a plurality of cavities, and a substantially flexible membrane disposed over the cavities for forming a respective plurality of light directing mechanisms, the light directing mechanisms disposed over the cavities. The respective curvatures of the light directing mechanisms are set using a pressure difference across each of the membrane portions disposed over the cavities. The respective curvatures of the light directing mechanisms may be controllably adjusted during operation of the light directing mechanisms.

17 Claims, 7 Drawing Sheets

300

300

400

500

600

700

METHOD AND APPARATUS FOR CONTROLLING CURVATURES OF MICROLENSES AND MICROMIRRORS

FIELD OF THE INVENTION

The invention relates to the field of communication networks and, more specifically, to fabrication and control of optical signal propagation devices.

BACKGROUND OF THE INVENTION

In general, existing methods of fabricating microlens and micromirror arrays requires complicated etching techniques. Disadvantageously, existing etching techniques lack the precision required for consistently forming uniform microlens and micromirror arrays (e.g., microlens and micromirror arrays having uniform curvature). Furthermore, existing etching techniques, including etching control techniques, are expensive. Moreover, existing microlens and micromirror fabrication techniques prevent adjustments to the curvatures of the microlens and micromirror surfaces set during microlens and micromirror fabrication.

SUMMARY OF THE INVENTION

Various deficiencies in the prior art are addressed through the invention of a method and apparatus for controlling curvatures of light directing devices. The apparatus includes a first substrate portion having formed therein a plurality of cavities, and a substantially flexible membrane disposed over the cavities for forming a respective plurality of light directing mechanisms, the light directing mechanisms disposed over the cavities. The respective curvatures of the light directing mechanisms are set using a pressure difference across each of the membrane portions disposed over the cavities. The respective curvatures of the light directing mechanisms may be controllably adjusted during operation of the light directing mechanisms.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an optical signal processing system; however, the present invention can be readily applied to other optical systems. In general, the present invention uses a membrane disposed over cavities of a substrate for forming light directing mechanisms (e.g., micromirrors, microlenses, and the like). The light directing mechanisms have respective curvatures. The curvatures of the light directing mechanisms are controllable (i.e., the curvatures of the light directing mechanisms may be made flat, concave, or convex). In one embodiment, the curvatures of the light directing mechanisms are controlled using pressure. In one such embodiment, the curvatures of the light directing mechanisms are controlled using a pressure difference across the membrane. In one embodiment, the amount of pressure exerted on the membrane (and, therefore, the pressure difference exerted on the opposing surfaces of the membrane) determine the respective curvatures of the light directing mechanisms.

Figure 1:
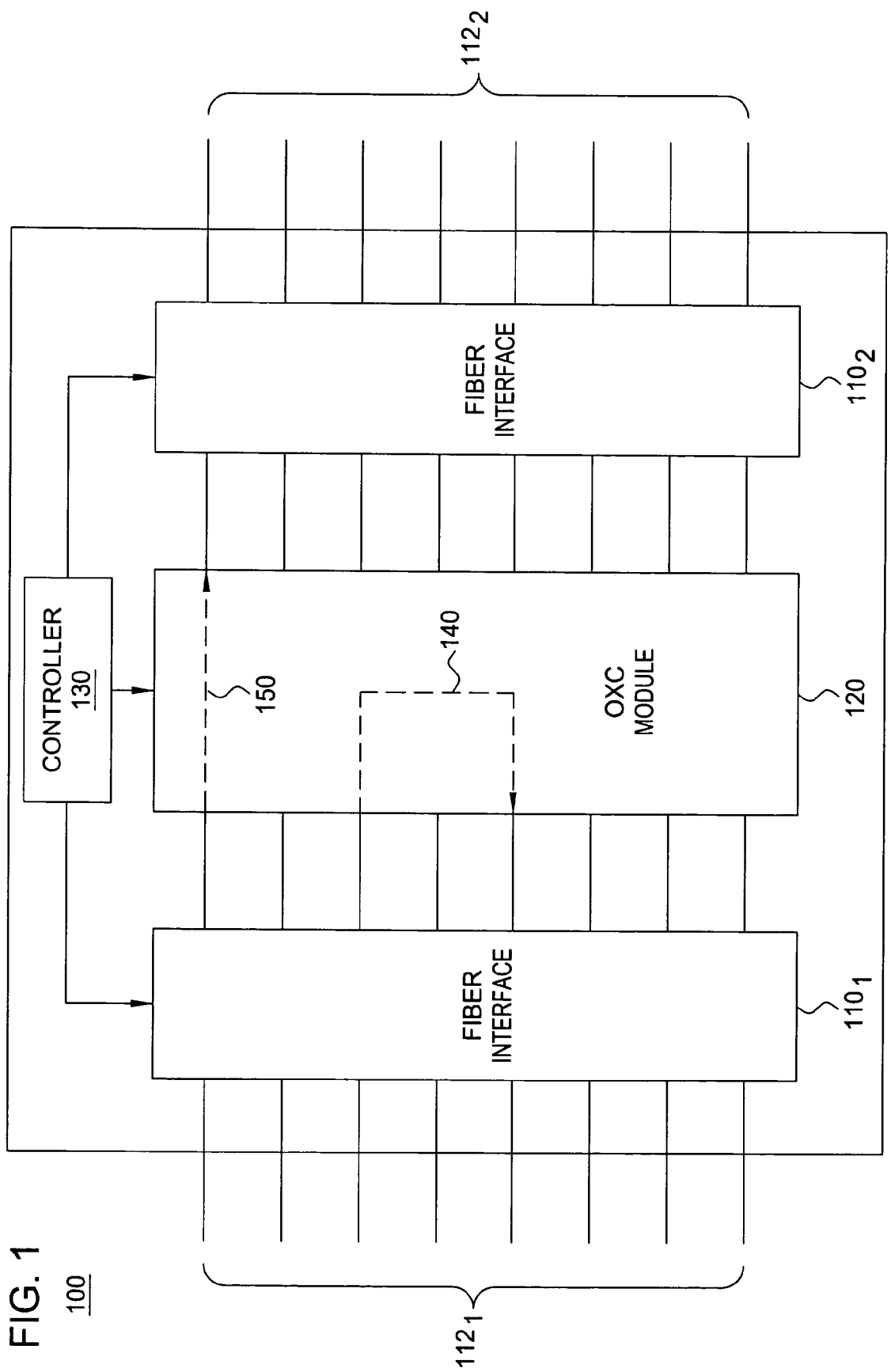
FIG. 1 depicts a high-level block diagram of an optical signal processing system.

FIG. 1 depicts a high-level block diagram of an optical cross-connect system. Specifically, optical cross-connect system 100 of FIG. 1 comprises a first fiber interface $110_1$, a second fiber interface $110_2$, an optical cross-connect (OXC) module 120, and a controller 130. The first fiber interface $110_1$ couples a first plurality of optical fibers $112_1$ (collectively, first optical fibers $112_1$) to OXC module 120. The second fiber interface $110_2$ couples a second plurality of optical fibers $112_2$ (collectively, second optical fibers $112_2$) to OXC module 120. In one embodiment, OXC module 120 is adapted for switching an optical signal from an input optical fiber to one of a plurality of output optical fibers.

In one embodiment, switching of optical signals between optical fibers is performed using one fiber interface. In one such embodiment, a first and second portions of first optical fibers $112_1$ function as input optical fibers and output optical fibers, respectively. As depicted in FIG. 1, OXC module 120 switches an optical signal from one of optical fibers in the first portion of first optical fibers $112_1$ to one of the optical fibers in the second portion of first optical fibers $112_1$ via a signal propagation path 140. In one embodiment, switching of optical signals between optical fibers is performed using two fiber interfaces (i.e., an input fiber interface and an output fiber interface). In one such embodiment, first optical fibers $112_1$ function as input fibers and second optical fibers $112_2$ function as output fibers. As depicted in FIG. 1, OXC module 120 switches an optical signal from one of the first optical fibers $112_1$ to one of the second optical fibers $112_2$ via a signal propagation path 150.

The controller 130 is adapted for receiving and processing commands from other modules and systems (not depicted). The controller 130 is adapted for generating and transmitting commands to associated modules and systems (illustratively, OXC module 120). In one embodiment, in which OXC module 120 uses light directing components (e.g., microlenses, micromirrors, and the like) for directing optical signals, controller 130 may communicate with OXC module 120 for controlling the curvatures of the light directing components in accordance with the present invention. For example, controller 130 may initiate a command to actuate a pressurizing means for controlling pressure on the light directing components, thereby adapting the respective curvatures of the light directing components. This capability may be desired to ensure optimal operation of an optical cross-connect system under various ambient conditions.

Although depicted and described with respect to specific functional components of an optical cross-connect system, the present invention is not intended to be limited to a specific cross-connect system configuration. Furthermore, although depicted and described in the context of an optical cross-connect system, the present invention may be used in various other optical signal processing systems. As such, the light directing component fabrication and post-fabrication control functions of the present invention, as depicted and described herein with respect to FIG. 2-FIG. 5, may be used for fabricating and controlling light directing components in various different optical systems.

Figure 2:
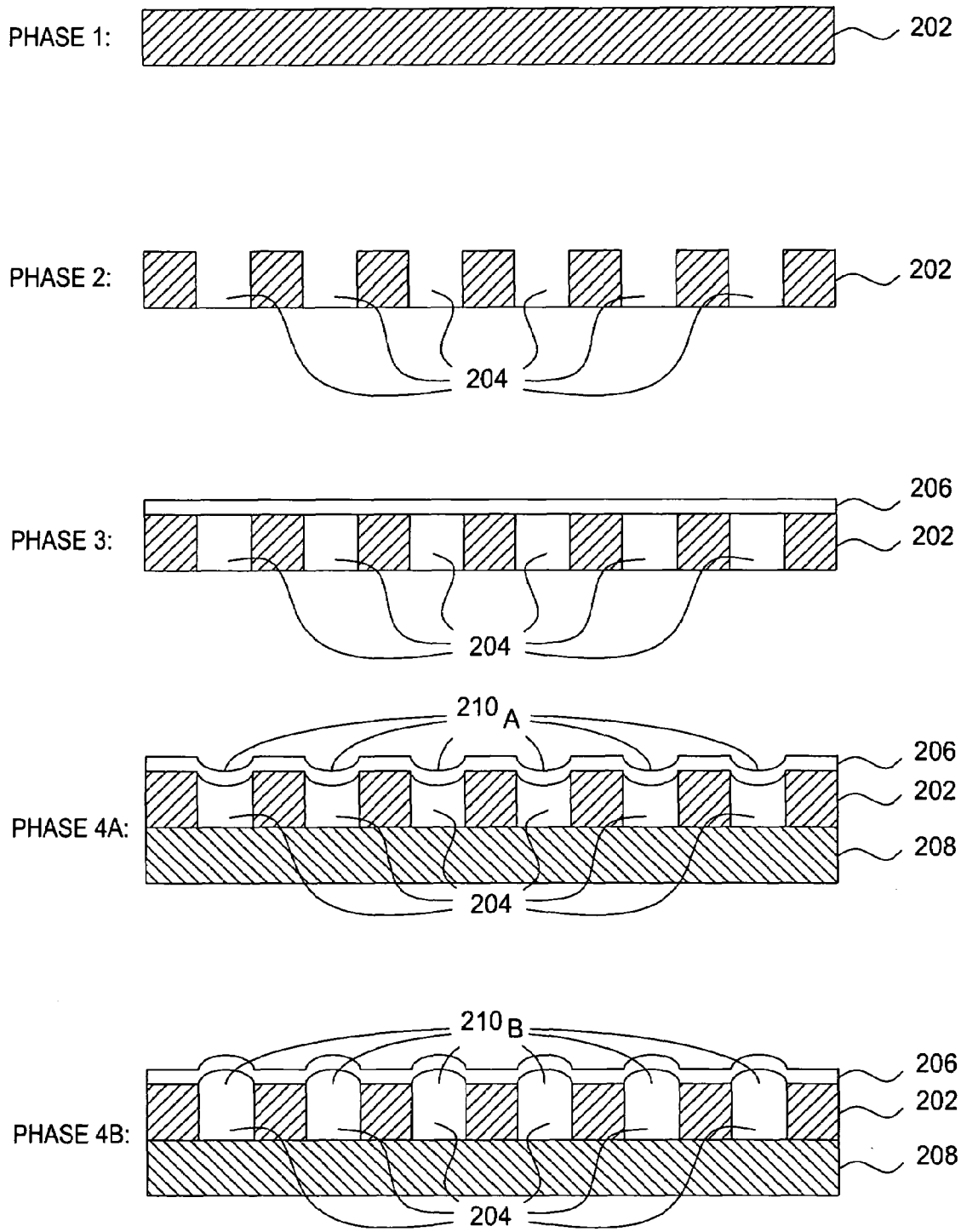
FIG. 2 depicts fabrication of an array of light directing components in accordance with one embodiment of the present invention.

FIG. 2 depicts fabrication of an array of light directing components in accordance with one embodiment of the present invention. As depicted in FIG. 2, in a first fabrication phase (denoted phase 1) a first wafer 202 is patterned. In one embodiment, first wafer 202 is a silicon-on-insulator (SOI) wafer. As depicted in FIG. 2, in a second fabrication phase (denoted phase 2) first wafer 202 is etched to form a plurality of cavities 204 (collectively, cavities 204) in first wafer 202. In one embodiment, in which the first wafer is a SOI wafer, the SOI wafer is etched to form cavities in the silicon handle side of the SOI wafer.

As depicted in FIG. 2, in a third fabrication phase (denoted phase 3) a membrane 206 is deposited over first wafer 202 such that membrane 206 covers respective openings of cavities 204. In one embodiment, membrane 206 is formed by depositing or laminating a film. In one embodiment, the film is a SOI film. In one embodiment, respective bottoms of cavities 204 etched in first wafer 202 are covered with a film for forming membrane 206. In accordance with the present invention, membrane 206 is adaptable for adjusting the curvature of the portions of membrane 206 disposed over cavities 204.

As depicted in FIG. 2, in a fourth fabrication phase (denoted as phases 4A and 4B), first wafer 202 is bonded to a second wafer 208 (e.g., a pyrex wafer). In one embodiment, second wafer 208 is anodically bonded to first wafer 202. In one embodiment, first wafer 202 is bonded to second wafer 208 in a pressurized environment. The pressurized environment exerts a force on the portions of membrane 206 disposed over the cavities 204, thereby adapting the portions of membrane 206 disposed over the cavities 204 to form curved surfaces (e.g., concave surfaces or convex surfaces, depending upon force exerted).

Figure 4:
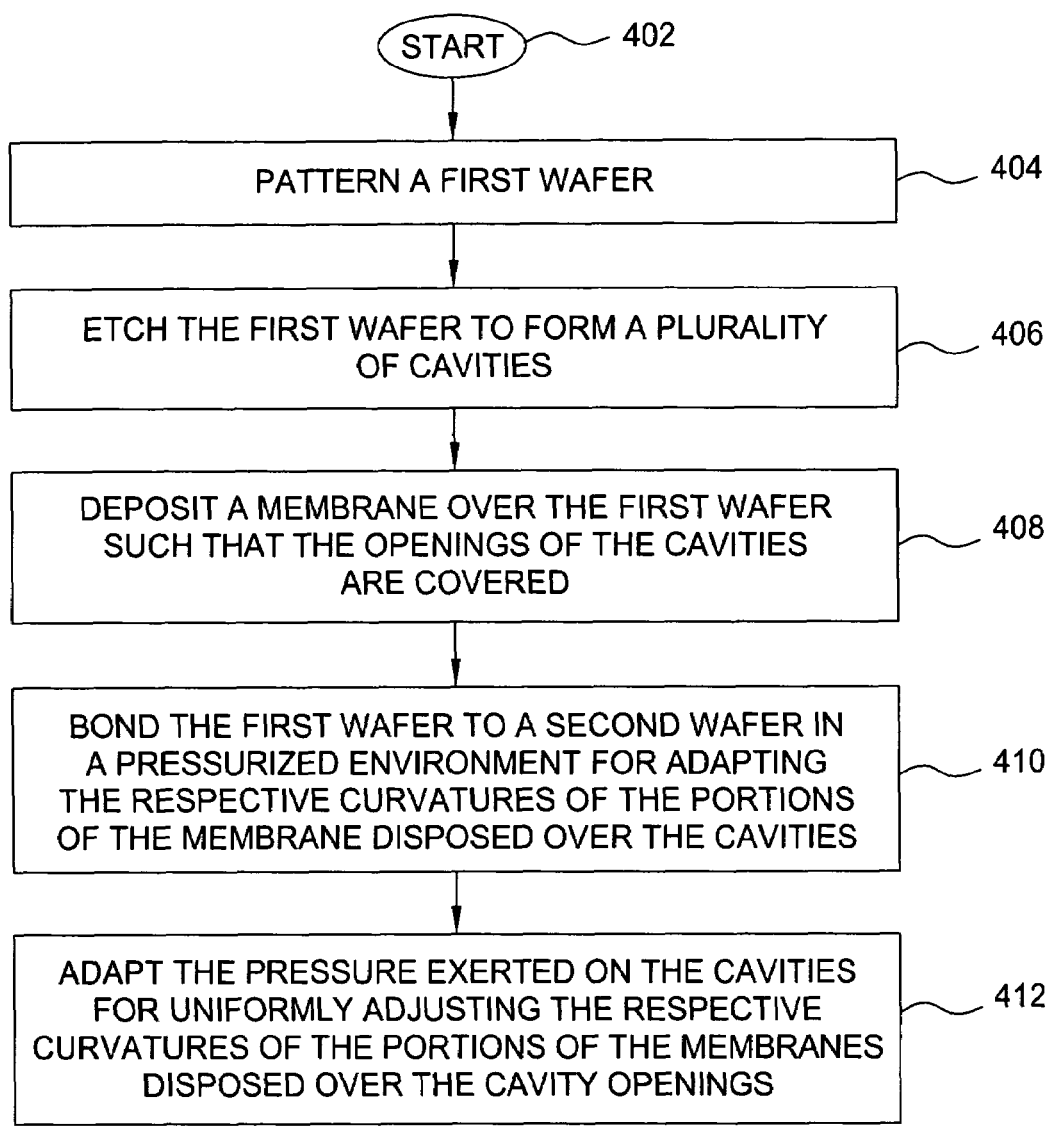
FIG. 4 depicts a method of fabricating an array of light directing components in accordance with one embodiment of the present invention.

In one embodiment, as depicted in phase 4A of FIG. 4, the pressurized environment is pressurized in a manner for setting the respective curvatures of a plurality of membrane portions $210_A$ (collectively, membrane portions $210_A$) disposed over cavities 204 to concave curvatures. In one such embodiment, cavities 204 are pressurized using a vacuum pressure. In one embodiment, as depicted in phase 4B of FIG. 4, the pressurized environment is pressurized in a manner for setting the respective curvatures of a plurality of membrane portions $210_B$ (collectively, membrane portions $210_B$) disposed over cavities 204 to convex curvatures. In one such embodiment, cavities 204 are pressurized using a bulging pressure. The concave membrane portions $210_A$ and convex membrane portions $210_B$ are collectively denoted as curved membrane portions 210.

Figure 3:
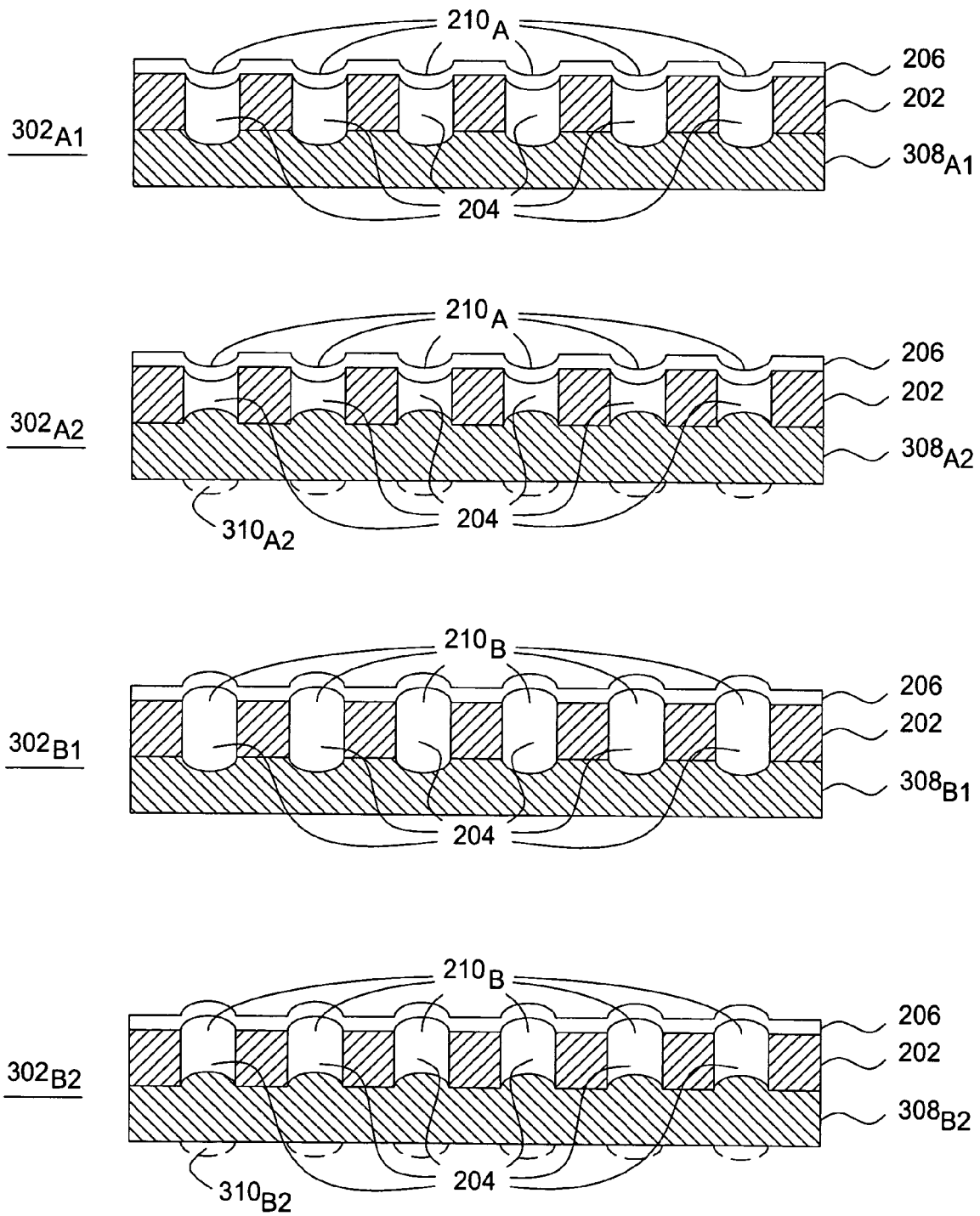
FIG. 3 depicts arrays of light directing components in accordance with alternative embodiments of the present invention.

FIG. 3 depicts differing arrays of light directing components in accordance with alternative embodiments of the present invention. In general, one or both of the first wafer 202 and the second wafer 208 may be adapted for forming additional curved surfaces disposed in parallel (where parallel is determined with respect to the direction of optical signals incident on the light directing mechanisms formed by the curved membrane portions 210) with the respective curved membrane portions 210. In one embodiment, a plurality of curved surfaces (e.g., curved membrane portions 210 and at least one additional curved surface) may be disposed in parallel for improving the light directing properties of the light directing mechanism formed thereby.

In one embodiment (denoted as $302_{A1}$), a plurality of concave surfaces are formed in parallel with the respective plurality of concave membrane portions $210_A$ (i.e., second wafer 208 is adapted to form second wafer $308_{A1}$). In one embodiment (denoted as $302_{A2}$), a plurality of convex surfaces are formed in parallel with the respective plurality of concave membrane portions $210_A$ (i.e., second wafer 208 is adapted to form second wafer $308_{A2}$). In one embodiment (denoted as $302_{B1}$), a plurality of concave surfaces are formed in parallel with the respective plurality of convex membrane portions $210_B$ (i.e., second wafer 208 is adapted to form second wafer $308_{B1}$). In one embodiment (denoted as $302_{B2}$), a plurality of convex surfaces are formed in parallel with the respective plurality of convex membrane portions $210_B$ (i.e., second wafer 208 is adapted to form second wafer $308_{B2}$).

It should be noted that each of these additional curved surfaces disposed in parallel with each of the cavities 204 may be formed using any of a number of curvature formation techniques (e.g., etching first wafer 202, etching second wafer 208, and the like). Although only two curved surfaces are depicted in parallel for each of the cavities 204, various numbers and combinations of additional surfaces (e.g., flat surfaces, concave surfaces, convex surfaces, and the like) may be formed in parallel with each of the cavities 204 for further adapting light incident on the formed light directing mechanisms.

FIG. 4 depicts a method in accordance with one embodiment of the present invention. Specifically, method 400 of FIG. 4 comprises a method for fabricating an array of light directing components and controlling respective curvatures of the light directing devices. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a first wafer is patterned. At step 406, the first wafer is etched to form a plurality of cavities. At step 408, a membrane is deposited over the first wafer such that the openings of the cavities are covered. In one embodiment, in which the first wafer has an existing membrane prior to etching, the etching is performed to the depth of the membrane (and step 408 is skipped). At step 410, the first wafer is bonded to a second wafer in a pressurized environment for adapting the respective curvatures of the portions of the membrane disposed over the openings of the cavities. At step 412, the pressure exerted on the cavities (e.g., either during fabrication or post-fabrication) is adapted for uniformly adjusting the respective curvatures of the portions of the membrane disposed over the openings of the cavities.

Figure 5:
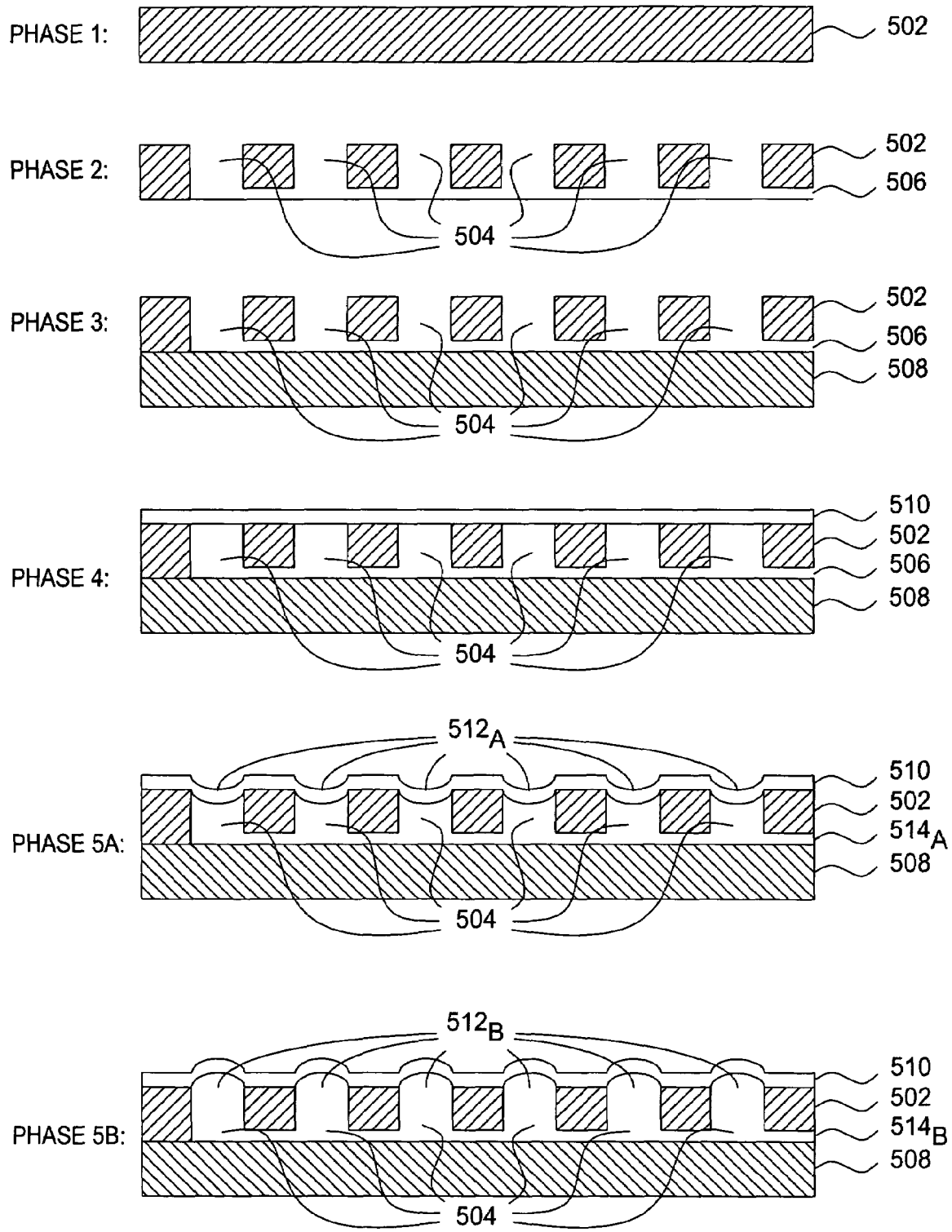
FIG. 5 depicts fabrication of an array of light directing components in accordance with one embodiment of the present invention.

FIG. 5 depicts fabrication of an array of light directing components in accordance with one embodiment of the present invention. As depicted in FIG. 5, in a first fabrication phase (denoted phase 1) a first wafer 502 is patterned. In one embodiment, first wafer 502 is a silicon-on-insulator (SOI) wafer. As depicted in FIG. 5, in a second fabrication phase (denoted phase 2) first wafer 502 is etched to form a plurality of cavities 504 (collectively, cavities 504) and an inter-cavity channel 506 between cavities 504 in first wafer 502. In one embodiment, inter-cavity channel 506 is closed on one end of first wafer 502 and open on the other end of wafer 502, thereby enabling pressurization and associated pressure control in cavities 504. In one embodiment, in which the first wafer is a SOI wafer, the SOI wafer is etched to form cavities 504 and inter-cavity channel 506 in the silicon handle side of the SOI wafer.

As depicted in FIG. 5, in a third fabrication phase (denoted phase 3) first wafer 502 is bonded to a second wafer 508 (e.g., a pyrex wafer). In one embodiment, second wafer 508 is anodically bonded to first wafer 502. In one embodiment, first wafer 502 is bonded to second wafer 508 in a manner for forming inter-cavity channel 506 between cavities 504. In one embodiment, inter-cavity channel 506 provides a channel through which cavities 504 may be adapted (e.g., through which cavities 504 may be pressurized, filled with a cavity material, and the like). For example, first wafer 502 may be bonded to one side of second wafer 508 (i.e., leaving an opening on the un-bonded side through which cavities 504 may be adapted. In one embodiment, first wafer 502 is bonded to second wafer 508 in a vacuum environment.

As depicted in FIG. 5, in a fourth fabrication phase (denoted phase 4) a membrane 510 is deposited over first wafer 502 such that membrane 510 covers respective openings of cavities 504. In one embodiment, membrane 510 is formed by depositing a film. In one embodiment, the film is a SOI film. In one embodiment, respective bottoms of cavities 504 etched in first wafer 502 are covered with a film for forming membrane 510. In accordance with the present invention, membrane 510 is adaptable for adjusting the curvature of the portions of membrane 510 disposed over cavities 504. As depicted in FIG. 5, in a fifth fabrication phase (collectively denoted as phases 5A and 5B), cavities 504 are pressurized using inter-cavity channel 506. The pressurized environment (i.e., pressurized cavities 504) exerts a force on the portions of membrane 206 disposed over the cavities 204, thereby adapting the portions of membrane 206 disposed over cavities 204 to form curved surfaces (e.g., concave surfaces or convex surfaces, depending upon force exerted).

In one embodiment, as depicted in phase 5A of FIG. 5, the pressurized environment is pressurized in a manner for setting respective curvatures of a plurality of membrane portions $512_A$ (collectively, membrane portions $512_A$) disposed over cavities 504 to concave curvatures. In one such embodiment, cavities 504 are pressurized using a vacuum pressure. In one embodiment, as depicted in phase 5B of FIG. 5, the pressurized environment is pressurized in a manner for setting the respective curvatures of a plurality of membrane portions $512_B$ (collectively, membrane portions $512_B$) disposed over cavities 504 to convex curvatures. In one such embodiment, cavities 504 are pressurized using a bulging pressure. The concave membrane portions $512_A$ and convex membrane portions $512_B$ are collectively denoted as curved membrane portions 512.

Figure 6:
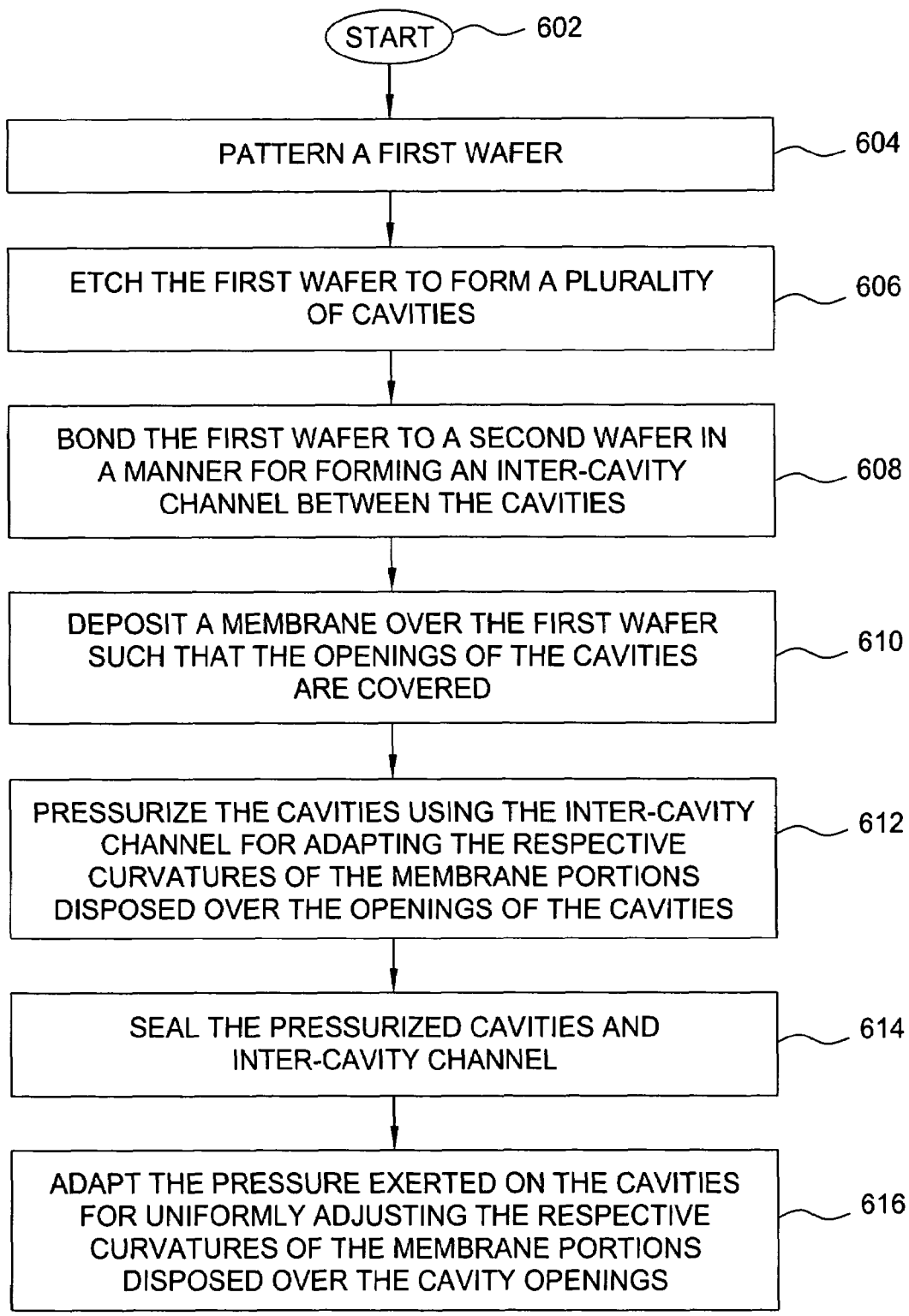
FIG. 6 depicts a method of fabricating an array of light directing components in accordance with one embodiment of the present invention.

FIG. 6 depicts a method in accordance with one embodiment of the present invention. Specifically, method 600 of FIG. 6 comprises a method for fabricating an array of light directing components and controlling respective curvatures of the light directing devices. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a first wafer is patterned. At step 606, the first wafer is etched to form a plurality of cavities. In one embodiment, the first wafer is etched to form an inter-cavity channel between the cavities. At step 608, the first wafer is bonded to a second wafer. In one embodiment, the first wafer is bonded to the second wafer in a manner for forming an inter-cavity channel between the cavities. At step 610, a membrane is deposited over the first wafer such that the openings of the cavities are covered. In one embodiment, in which the first wafer has an existing membrane prior to etching, the etching is performed to the depth of the membrane (and step 610 is skipped). At step 612, the cavities are pressurized for adapting the respective curvatures of the portions of the membrane disposed over the openings of the cavities. At step 614, the pressurized cavities and inter-cavity channel are sealed. At step 616, the pressure exerted on the cavities (e.g., either during fabrication or post-fabrication) is adapted for uniformly adjusting the respective curvatures of the portions of the membrane disposed over the openings of the cavities.

Figure 7:
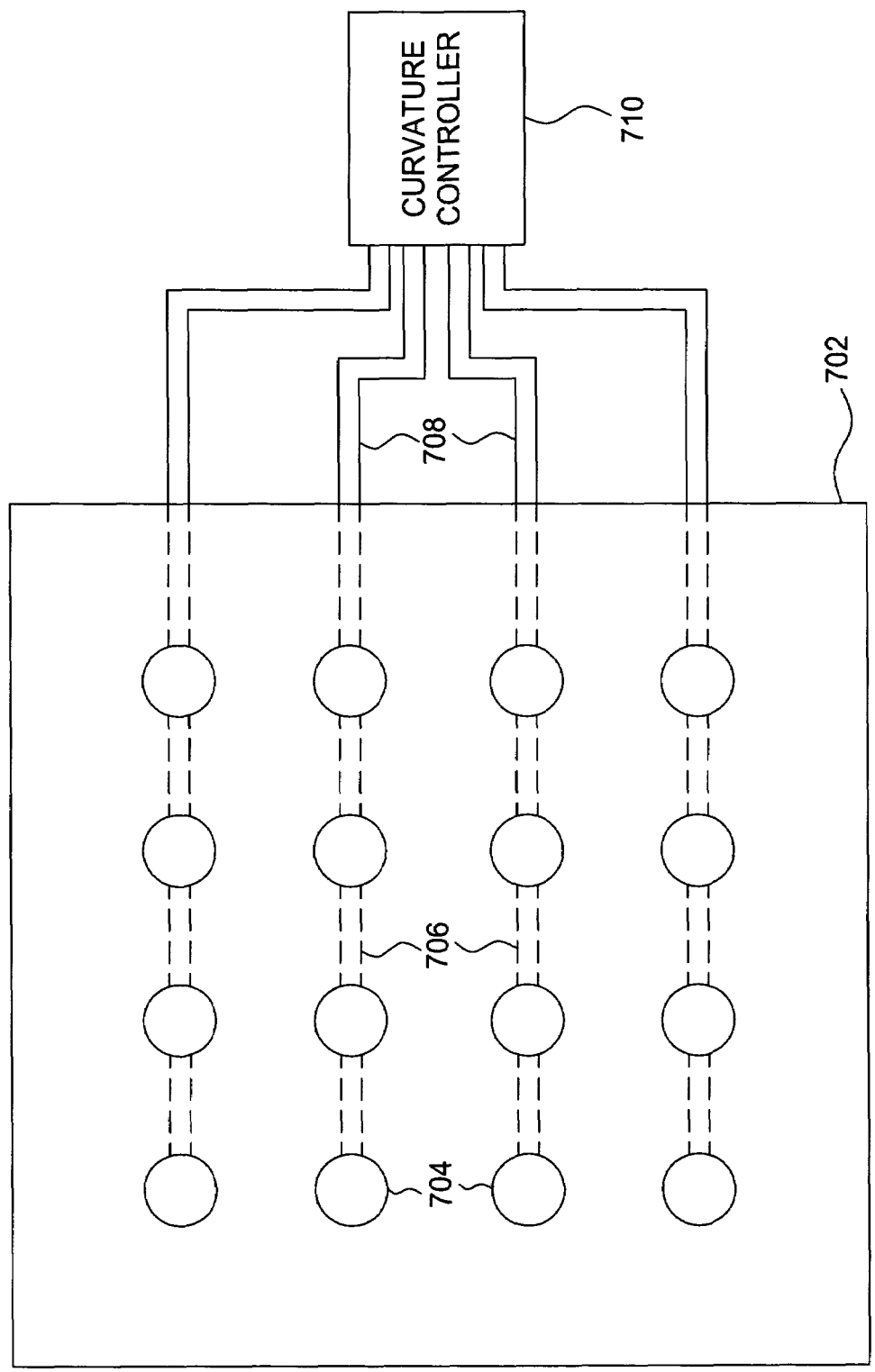
FIG. 7 depicts a top view of a curvature control system having a plurality of light directing mechanisms fabricated and controlled in accordance with one embodiment of the present invention.

FIG. 7 depicts a top view of a curvature control system having a plurality of light directing mechanisms fabricated and controlled in accordance with one embodiment of the present invention. Specifically, curvature control system 700 of FIG. 7 depicts a substrate 702 having a plurality of light directing mechanisms 704 (collectively, light directing mechanisms 704) disposed therein. For each row of light directing mechanisms depicted in FIG. 7, the cavities (not depicted) formed below respective light directing mechanisms 704 are connected via a respective plurality of inter-cavity channels 706 (collectively, inter-cavity channels 706). The inter-cavity channels 706 are coupled to a curvature controller 710 via a respective plurality of pressure exertion couplers 708 (collectively, pressure exertion couplers 708).

As depicted in FIG. 7, curvature controller 710 is adapted for controlling the curvatures of the light directing mechanisms 704. Specifically, curvature controller 710 is adapted for adjusting respective curvatures of light directing mechanisms 704. For example, curvature controller 710 may be adapted for increasing or decreasing the concavity of concave surfaces, increasing or decreasing convexity of convex surfaces, adjusting concave surfaces to form convex surface, adjusting convex surfaces to form concave surface, and the like. In one embodiment, controller 710 is adapted for performing such curvature adjustments using various combinations of vacuum and pumping means. Although depicted as controlling rows of light directing mechanisms 704, in one embodiment, curvature controller 710 is adapted for controlling all light directing mechanisms 704 (i.e., across multiple rows), controlling each light directing mechanism 704 individually, and the like.

In one embodiment, the curvatures of the light directing mechanisms are controllable during light directing mechanism fabrication (i.e., for setting the curvatures of the light directing mechanisms). In one embodiment, the curvatures of the light directing mechanisms are controllable post-fabrication (i.e., for continuously adapting the curvatures of the light directing mechanisms). In one embodiment, the curvatures of the light directing mechanisms may be controlled using at least one of a plurality of pressure types (e.g., overpressure exerted on the external surface of the membrane from which the light directing mechanisms are formed, underpressure exerted on the internal surface of the membrane from which the light directing mechanisms are formed, and the like).

In one embodiment, overpressure (i.e., external pressure) is exerted for controlling membrane movement, thereby adjusting the curvature of the light directing mechanisms formed in the membrane. In one embodiment, exertion of overpressure may be used for adapting the curvature of the light directing mechanisms to produce concave curvatures. In one embodiment, exertion of overpressure may be used for adapting the curvature of the light directing mechanisms to produce convex curvatures. In one embodiment, overpressure may be exerted using one of a plurality of pressure exerting means, including pressure vacuums, pressure pumps, and the like.

In one embodiment, underpressure (i.e., internal pressure) is exerted for controlling membrane movement, thereby adjusting the curvature of the light directing mechanisms formed in the membrane. In one embodiment, exertion of underpressure may be used for adapting the curvature of the light directing mechanisms to produce concave curvatures. In one embodiment, exertion of underpressure may be used for adapting the curvature of the light directing mechanisms to produce convex curvatures. In one embodiment, underpressure may be exerted using one of a plurality of pressure exerting means, including pressure vacuums, pressure pumps, and the like.

In one embodiment, various membrane parameters may be adapted for controlling the respective curvatures of the light directing mechanisms formed in the membrane. In one embodiment, physical membrane parameters may be adapted for controlling light directing mechanism curvatures. For example, physical membrane parameters may include membrane material, membrane transparency, membrane thickness, and like parameters. In one embodiment, geometrical membrane parameters may be adapted for controlling light directing mechanism curvatures. Furthermore, additional parameters may be adapted for controlling the respective curvatures of the light directing mechanisms. For example, wafer materials, wafer thickness, wafer transparency, cavity diameter, cavity vacuum level, and like parameters may be adapted for controlling light directing mechanism curvatures.

As described herein, in one embodiment, a plurality of light directing mechanisms is formed in a membrane. In one such embodiment, the plurality of light directing mechanisms formed in the membrane forms an array of light directing mechanisms. In one embodiment, the respective curvature of each light directing mechanism in a plurality of light directing mechanisms is controlled as a group. In one embodiment, the respective curvature of each light directing mechanism in the plurality of light directing mechanisms is individually controllable. As described herein, various light directing mechanisms having adjustable curvatures may be fabricated, as well as controlled post-fabrication, in accordance with the present invention.

In one embodiment, light directing mechanisms fabricated and controlled in accordance with the present invention include light collimating mechanisms (e.g., microlenses). In one such embodiment, the materials used for fabricating the microlenses (e.g., the first wafer, the second wafer, and the like) must be transparent to the wavelength(s) of light used in the applications for which the microlenses are intended. In one embodiment, refractive microlenses may be formed by filling the cavity with a material having a refractive index different from the refractive index of the outside of the cavity. In one embodiment, the cavity material may include either a liquid or a gas. In this embodiment, the light used has a wavelength for which the wafer layers and cavity material are transparent.

In one embodiment, light directing mechanisms fabricated and controlled in accordance with the present invention include light reflecting mechanisms (e.g., micromirrors). In one such embodiment, in addition to the fabrication techniques depicted and described herein with respect to FIG. 2-FIG. 6, the external surfaces of the curved membrane portions (illustratively, curved membrane portions 410 and 512) are rendered reflective. In one such embodiment, the external surfaces of the curved membrane portions rendered reflective by evaporating a thin reflective film (e.g., a titanium/gold) on the external surfaces of the curved membrane portions.

As depicted and described herein, light directing mechanisms fabricated and controlled in accordance with the present invention include light focusing mechanisms, light collimating mechanisms, light reflecting mechanisms, light refracting mechanisms, and the like. As such, a membrane in accordance with the present invention may be formed from a variety of different materials, including optically transparent materials, optically opaque materials, optically reflective materials, and the like. For example, a membrane adapted for forming a microlens array may be formed from a substantially clear material for enabling incident optical signals to propagate through the membrane. For example, a membrane adapted for forming a micromirror array may be formed using a reflective material for reflecting incident optical signals, thereby preventing incident optical signals from propagating through the membrane.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a first substrate portion having formed therein a plurality of cavities;
   a substantially flexible membrane disposed over the cavities, wherein portions of the membrane disposed over the cavities are adapted for having a respective plurality of light directing mechanisms formed thereon; and
   a controller for dynamically adjusting curvatures of the light directing mechanisms by controlling a pressure difference across each of the portions of the membrane disposed over the cavities.

2. The apparatus of claim 1, wherein the pressure difference is controlled by pressurizing the cavities associated with the light directing mechanisms.

3. The apparatus of claim 1, further comprising:
   a second substrate portion bonded to the first substrate portion in a manner for forming an inter-cavity channel between the cavities in the first substrate portion.

4. The apparatus of claim 3, wherein the pressure difference is controlled by pressurizing the cavities associated with the light directing mechanisms, wherein the cavities are pressurized using the inter-cavity channel.

5. The apparatus of claim 3, wherein the second substrate portion is bonded to the first substrate portion using at least one anodic bond.

6. The apparatus of claim 3, further comprising:
   a refractive material disposed within the cavities and the inter-cavity channel.

7. The apparatus of claim 1, wherein the curvatures of the light directing mechanisms are concave.

8. The apparatus of claim 1, wherein the curvatures of the light directing mechanisms are convex.

9. A method for controllably adjusting curvatures of a plurality of light directing mechanisms, comprising:
   providing a first substrate portion having a plurality of cavities formed therein and having a membrane deposited thereon, wherein portions of the membrane disposed over the cavities are adapted for having a respective plurality of light directing mechanisms formed thereon; and adjusting curvatures of the light directing mechanisms dynamically by controlling a pressure difference across each of the portions of the membrane disposed over the cavities.

10. The method of claim 9, further comprising:
bonding the first substrate portion to a second substrate portion in a pressurized environment.

11. The method of claim 9, further comprising:
bonding the first substrate portion to a second substrate portion for forming an inter-cavity channel between the plurality of cavities formed in the first substrate;
wherein the pressure difference across each of the membrane portions disposed over the cavities is controlled via the inter-cavity channel.

12. The method of claim 11, further comprising:
sealing the inter-cavity channel in a manner for enabling access to the inter-cavity channel by a controller configured for controlling the pressure difference across each of the membrane portions disposed over the cavities.

13. The method of claim 9, wherein controlling the pressure difference across each of the membrane portions disposed over the cavities comprises:
exerting a substantially uniform pressure across the membrane portions disposed over the cavities for adapting the curvatures of the light directing mechanisms to form thereby substantially uniform concave curvatures.

14. The method of claim 13, wherein the substantially uniform pressure comprises a substantially uniform vacuum pressure.

15. The method of claim 9, wherein controlling the pressure difference across each of the membrane portions disposed over the cavities comprises:
exerting a substantially uniform pressure across the membrane portions disposed over the cavities for adapting the curvatures of the light directing mechanisms to form thereby substantially uniform convex curvatures.

16. The method of claim 9, further comprising:
bonding the first substrate portion to a second substrate portion;
wherein respective portions of the second substrate portion disposed opposite the cavities of the first substrate portion are adapted for forming additional light directing mechanisms; and
wherein the additional light directing mechanisms optically cooperate with the light directing mechanisms for directing incident optical signals.

17. An apparatus, comprising:
a first substrate portion having formed therein a plurality of cavities;
a second substrate portion bonded to the first substrate portion in a manner for forming an inter-cavity channel connecting the plurality of cavities;
a membrane disposed over a plurality of openings of the plurality of cavities; and
a controller for controlling curvatures of the portions of the membrane associated with the plurality of cavities by controlling a pressure difference across the portions of the membrane disposed over the cavities, wherein the pressure difference across the portions of the membrane disposed over the cavities is controlled using the inter-cavity channel.

* * * * *

UNITED STATES PATENT AND TRADEMARK OFFICE
CERTIFICATE OF CORRECTION

PATENT NO. : 7,649,670 B2 Page 1 of 1
APPLICATION NO. : 11/245761
DATED : January 19, 2010
INVENTOR(S) : Basavanhally et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Twenty-eighth Day of December, 2010

David J. Kappos
*Director of the United States Patent and Trademark Office*